United States Patent
Orleth (10) Patent No.: US 9,204,175 B2
(45) Date of Patent: Dec. 1, 2015

(54) PROVIDING PARTIAL FILE STREAM FOR GENERATING THUMBNAIL

(75) Inventor: Robert Orleth, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 780 days.

(21) Appl. No.: 13/197,068

(22) Filed: Aug. 3, 2011

(65) Prior Publication Data

US 2013/0036233 A1    Feb. 7, 2013

(51) Int. Cl.
| | |
|---|---|
| G06F 15/16 | (2006.01) |
| H04N 21/2343 | (2011.01) |
| H04N 21/84 | (2011.01) |
| H04N 21/8549 | (2011.01) |
| H04L 29/06 | (2006.01) |
| H04L 29/08 | (2006.01) |
| H04N 21/2743 | (2011.01) |

(52) U.S. Cl.
CPC .... *H04N 21/234363* (2013.01); *H04L 65/4084* (2013.01); *H04L 65/602* (2013.01); *H04L 65/608* (2013.01); *H04L 67/06* (2013.01); *H04N 21/84* (2013.01); *H04N 21/8549* (2013.01); *H04N 21/2743* (2013.01)

(58) Field of Classification Search
CPC ............ G06F 17/30843; H04L 65/601; G06K 9/00711; G06K 9/00744; H04N 21/84; H04N 21/8549
USPC .................................. 709/225, 229, 231, 247
See application file for complete search history.

(56) References Cited

U.S. PATENT DOCUMENTS

| | | | |
|---|---|---|---|
| 5,953,729 A * | 9/1999 | Cabrera et al. ......................... 1/1 |
| 7,499,929 B2 | 3/2009 | Rogers et al. |
| 7,823,058 B2 | 10/2010 | Pea et al. |
| 8,078,603 B1 * | 12/2011 | Chandratillake et al. ...... 707/706 |
| 2003/0233929 A1 * | 12/2003 | Agnihotri ......................... 84/609 |
| 2004/0109673 A1 * | 6/2004 | Yatabe et al. .................... 386/69 |
| 2006/0026524 A1 * | 2/2006 | Ma et al. ......................... 715/713 |
| 2006/0036724 A1 * | 2/2006 | Iizuka et al. ................... 709/223 |
| 2006/0055798 A1 * | 3/2006 | Kuwata ..................... 348/231.99 |
| 2006/0064716 A1 * | 3/2006 | Sull et al. .......................... 725/37 |
| 2006/0107289 A1 * | 5/2006 | DeYonker et al. ............... 725/37 |
| 2006/0210157 A1 * | 9/2006 | Agnihotri et al. ............. 382/173 |
| 2006/0242163 A1 | 10/2006 | Miller et al. |
| 2007/0168864 A1 * | 7/2007 | Yamamoto et al. ........... 715/716 |
| 2007/0204238 A1 * | 8/2007 | Hua et al. ....................... 715/838 |

(Continued)

OTHER PUBLICATIONS

"Working with File Systems", Retrieved at <<http://technet.microsoft.com/en-us/library/bb457112.aspx>>, Nov. 3, 2005, pp. 63.

(Continued)

*Primary Examiner* — Liangche A Wang
*Assistant Examiner* — Johnny Aguiar
(74) *Attorney, Agent, or Firm* — Thomas Wong; Jim Ross; Micky Minhas (57) ABSTRACT

A partial file stream is utilized to conserve resources and provide services when a file stream such as video file stream is requested for processing to generate a thumbnail. A file stream host provides a partial file stream generated from the beginning and end parts of the video file stream adjoined by a middle part. The partial file stream minimizes resource utilization. The partial file stream also enables access by external processes to generate the thumbnail and minimize exposure to security risks by stopping direct access to the file stream host.

16 Claims, 6 Drawing Sheets

(56) References Cited

U.S. PATENT DOCUMENTS

| | | | |
|---|---|---|---|
| 2007/0268406 A1* | 11/2007 | Bennett | 348/565 |
| 2008/0097970 A1* | 4/2008 | Olstad et al. | 707/3 |
| 2009/0013048 A1* | 1/2009 | Partaker et al. | 709/206 |
| 2009/0158157 A1 | 6/2009 | Shields et al. | |
| 2010/0036878 A1* | 2/2010 | Kim | 707/104.1 |
| 2010/0281042 A1 | 11/2010 | Windes et al. | |
| 2010/0332401 A1* | 12/2010 | Prahlad et al. | 705/80 |
| 2011/0032353 A1* | 2/2011 | Vallone et al. | 348/143 |
| 2011/0064318 A1 | 3/2011 | Gao et al. | |
| 2011/0082869 A1* | 4/2011 | Ogikubo et al. | 707/756 |
| 2011/0085778 A1* | 4/2011 | Iwase et al. | 386/228 |
| 2011/0099609 A1* | 4/2011 | Malhotra et al. | 726/4 |

OTHER PUBLICATIONS

Bock, et al., "Measuring and Improving Single-User NAS Performance", Retrieved at <<software.intel.com/file/21204>>, Retrieved Date: Jun. 9, 2011, pp. 1-14.

* cited by examiner

PROVIDING PARTIAL FILE STREAM FOR GENERATING THUMBNAIL

BACKGROUND

With increased deployment and use of data networks, video feeds for various purposes are a common aspect of daily experiences for many people. Due to modern advances, integrated devices enable capturing video in variety of situations and for a variety of demand. Multiple purpose devices have enabled the captured video to be annotated with additional information such as location, time, and other specifics. Network capabilities enable sharing the captured video in social applications. Social applications further drive the demand for capturing and sharing of video.

Resource utilization is a concern due to the increase in handling of captured video. Although partially mitigated by advanced encoding technologies, video files tend to be large in size, as such, difficult to stream. Additionally, demand for access to video based media increases security risks associated with storing and managing the media. A range of external entities from social application providers to handheld device applications demand and require access to media to provide variety of services to consumers such as annotation and public sharing. Exposure to so many external processes for granting access to video is not optimal.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a partial file stream for generating a thumbnail. A system according to embodiments may receive a request for a file stream such as a video file stream for generating the thumbnail. The system may determine a beginning and an end part of the file stream. The system may generate a partial file stream with same properties as the file stream from the beginning and end parts of the file stream and an empty middle part. The system may transmit the partial file stream to a sandbox for processing.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a partial file stream may be provided for generating a thumbnail. The partial file stream may be generated from a video file stream. A file stream provider system may generate the partial file stream from the beginning and end parts of the video file stream and an empty middle part. The empty middle part may contain zeros or be filled through other means to reduce the relatively large part of the file such as New File Technology System (NTFS) sparse file feature. The system may transmit the partial file stream to a sandbox for exposure to processes generating the thumbnail. The partial file stream may reduce resource utilization through bandwidth savings.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

According to embodiments, the system may be a file stream provider server that includes one or more databases and a thumbnail system. The system may host file streams such as video file streams. An external process may request one or more of the video file streams. The thumbnail system may truncate the video file stream(s) to conserve bandwidth resources and throughput of the database by transmitting a partial file stream with an empty middle part and beginning and end parts of the video file stream to a sandbox for processing. The sandbox may be an internal or external entity exposing the partial file stream to external processes to generate the thumbnail from the partial file stream. The sandbox may be a local or remote process. The sandbox is a remote process when it is executed in another system and accessed through a network. The sandbox is a local process when it is executed as a separate process in the database system.

Throughout this specification, the term "platform" may be a combination of software and hardware components for providing a file stream for generating a thumbnail, but not limited to, video file stream systems. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
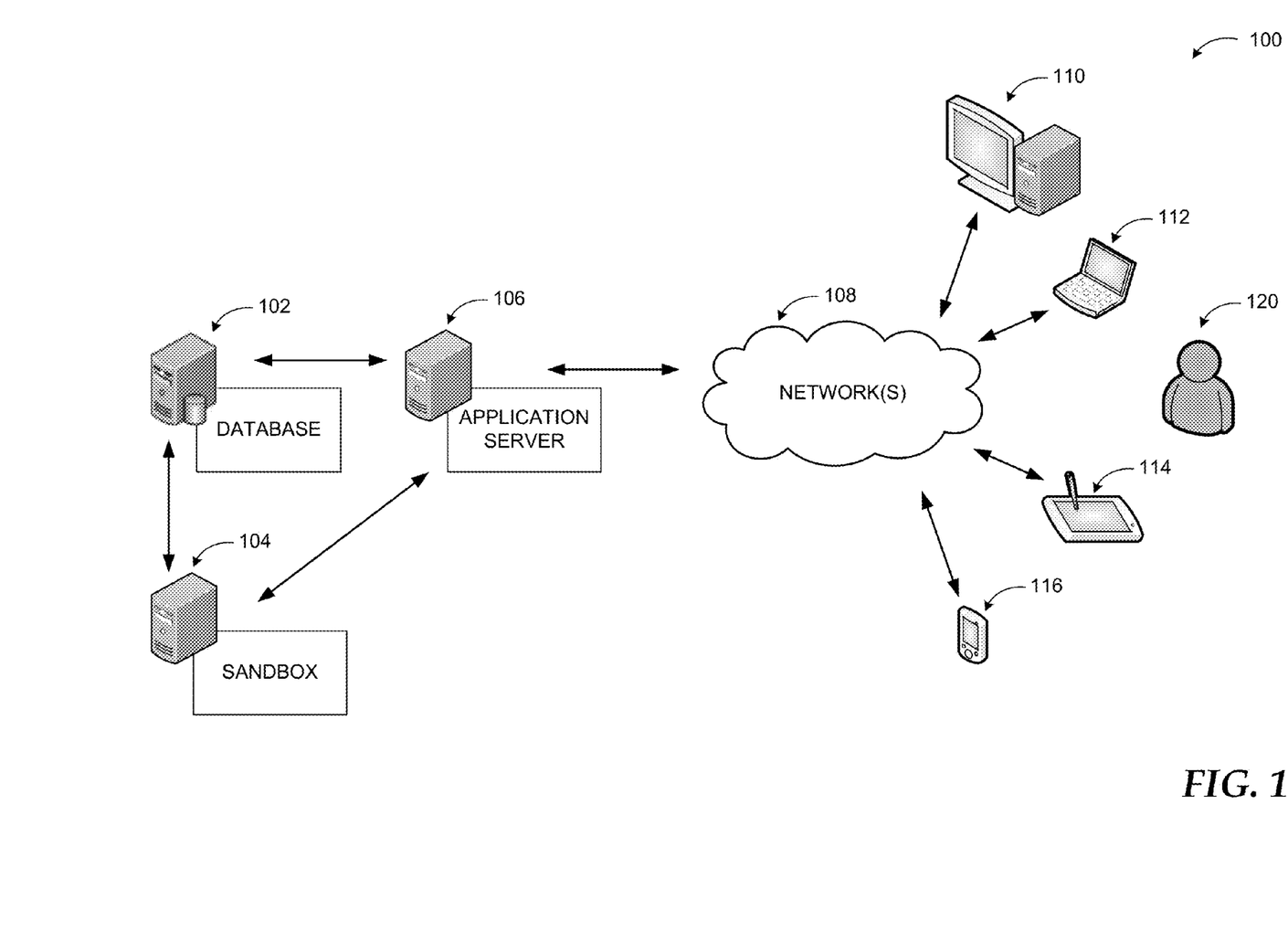
FIG. 1 illustrates components of a system providing a partial file stream for generating a thumbnail according to embodiments.

FIG. 1 illustrates components of a system providing a partial file stream for generating a thumbnail according to embodiments, where a database 102 may host one or more file streams in diagram 100. According to an embodiment, the file streams may be video file streams. A user 120 may request access to a video file stream hosted in database 102 through applications executing in client devices. The client devices may be a desktop computer 110, a laptop computer 112, a tablet device 114, a smart phone 116, etc. The client devices may access the database through network(s) 108 and use an application server 106 as an intermediary. The application server 106 may be a web server executing server applications providing services to client devices and applications executing on the client devices.

The database 102 may be a file repository. It may host and index file streams. The database 102 may execute a database application to manage access to hosted file streams. Alternatively, the database 102 may simply provide processes exposing the hosted file streams to external entities through requests from a connected network.

The database 102 and application server 106 may be part of a distributed computing system in which multiple hardware and software may serve as an entity providing a service. An example may be a database 102 hosting file streams across multiple servers based on variety of system requirements. The database 102 may be visible to external entities as a single entity by the distributed application exposing the services provided by the database 102.

In another embodiment, the database 102 may transmit the partial file stream to a sandbox 104. The sandbox 104 may be used to expose the partial file stream to external entities for processing. An example process may be extracting a thumbnail from the partial file stream to serve as the corresponding video file stream's thumbnail. The purpose of utilizing a sandbox may be for security and separation of functionality. A sandbox may shield the contents of a database from external processes requiring access to hosted file streams. Utilization of a sandbox may provide needed functionality while stopping risky exposure to external processes. An external process such as a video codec may access a video file stream through the partial file stream within the sandbox. The risk that a malicious user provides a video that causes the codec to temporarily run malicious code, in other words, to make the codec run code on behalf of the malicious user, is limited by the use of the sandbox. Thus, the sandbox may prevent a malicious user from injecting permanent malware into the codec itself. The partial file stream usage may also minimize resource utilization as discussed above. In yet another embodiment, the client devices may access the sandbox 104 directly instead of an intermediary such as application server 106. The client devices may execute their video codecs in sandbox 104 to retrieve a thumbnail from a partial file stream for the requested file stream from database 102.

Figure 2:
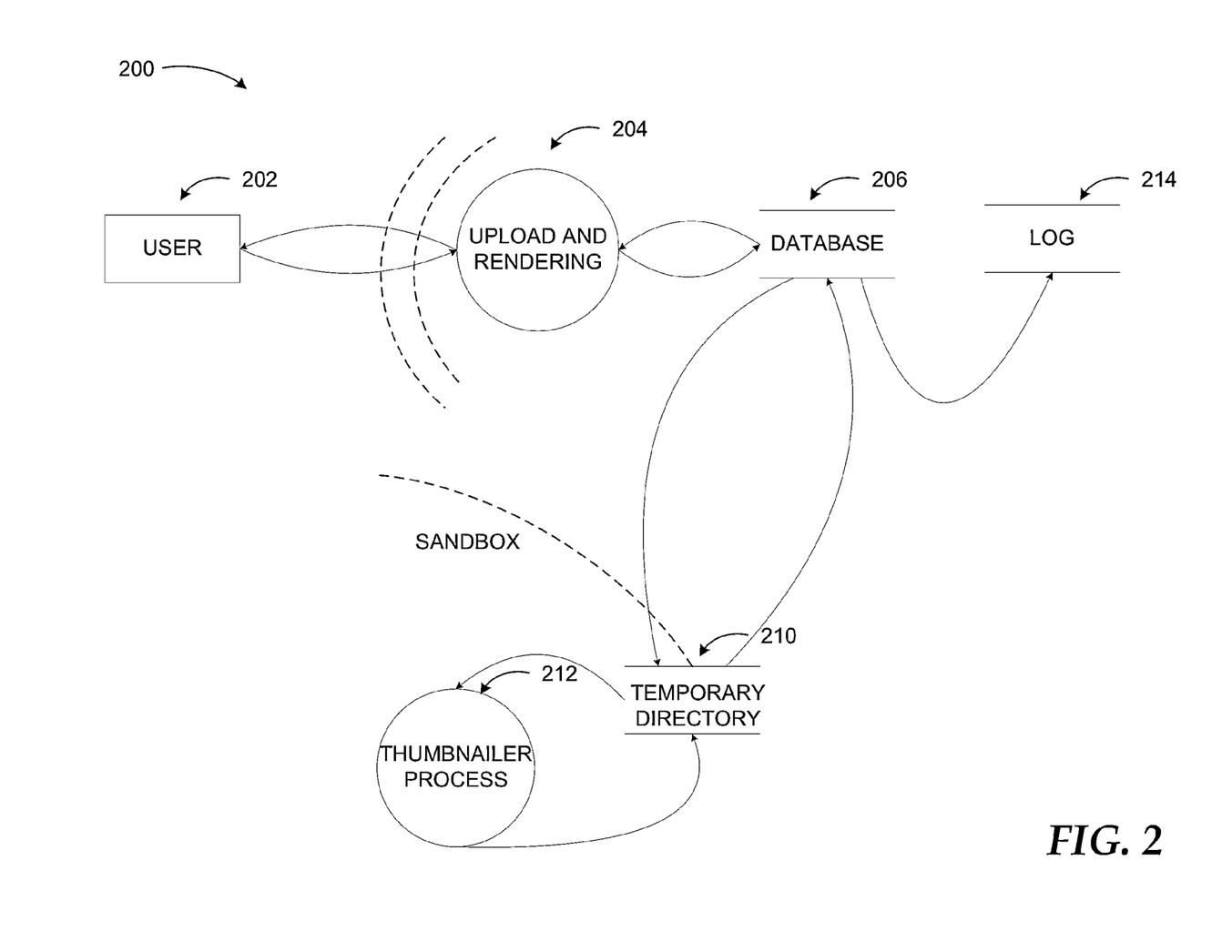
FIG. 2 illustrates an example partial file stream provider according to an embodiment.

FIG. 2 illustrates an example partial file stream provider in diagram 200 according to an embodiment. A user 202 may upload a video to a process 204 to upload and render the video to a database 204. The process 204 may convert the video to a video file stream according to specifications of the database 206. The upload and render process may involve processing the video through a video codec to produce the video file stream. The process 204 may save the video file stream to the database 206.

In a system according to embodiments, process 212 may truncate the video file stream by replacing the middle part of the file stream with an empty part. The partial file stream may be stored in a temporary directory 210. Process 212 may access the temporary directory 210 to read the partial file stream. As discussed above, external processes such as 212 may be executed in the sandbox to generate the thumbnail, additional metadata, and a log of the results.

In an alternative embodiment, the process 212 may store the generated thumbnail, metadata, and log in the temporary directory 210. Records of thumbnail generation may be saved in a log 214 for administrative purposes.

In yet another embodiment, the process 212 may transmit the thumbnail and the metadata to the database 206. The database 206 may store the thumbnail and metadata for access by process 204. The process 204 may access the thumbnail and metadata and transmit them back to the user 202 for viewing the thumbnail and any additional information contained in the metadata about the video file stream.

Figure 3:
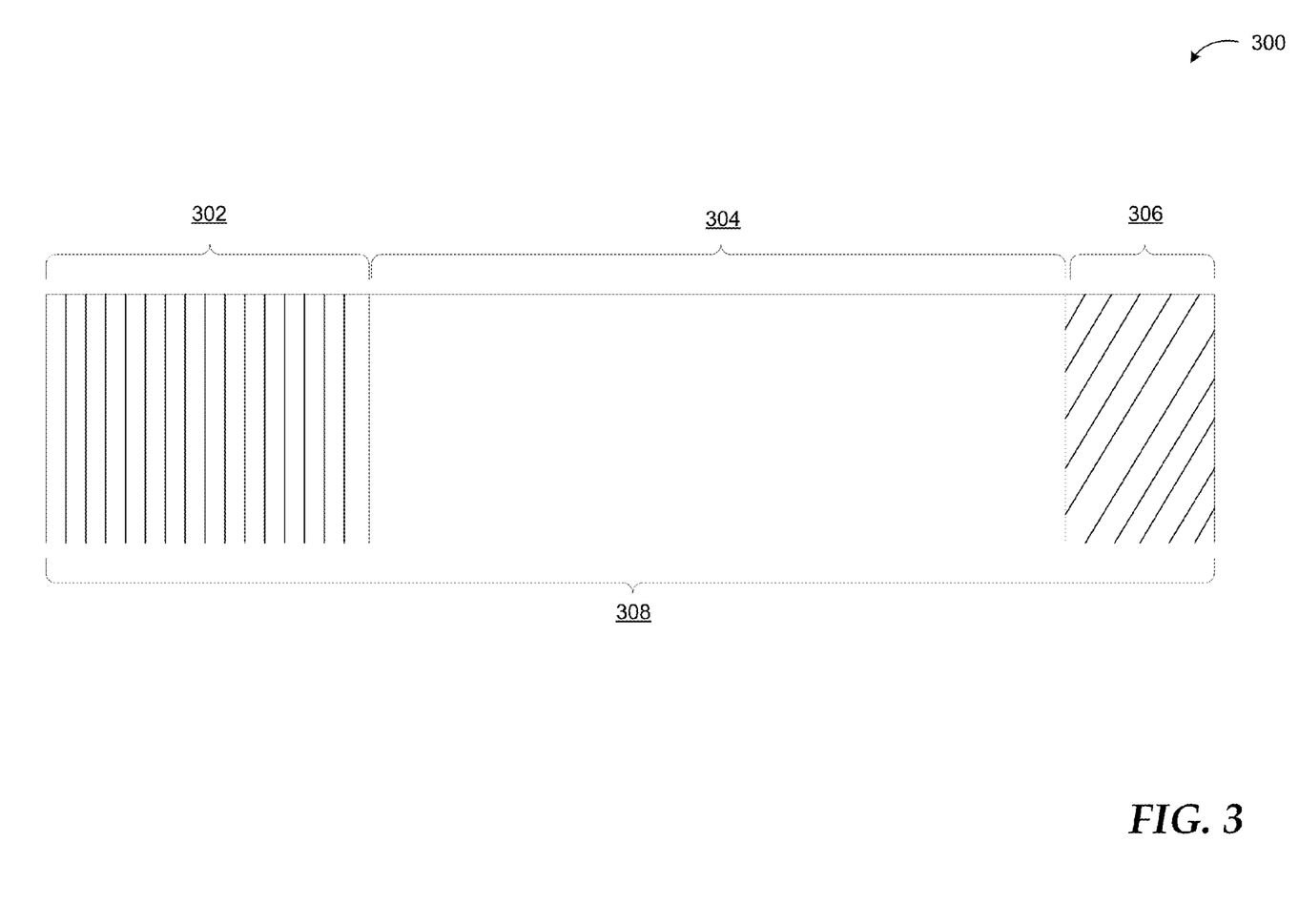
FIG. 3 illustrates an example partial file stream according to an embodiment.

FIG. 3 illustrates an example partial file stream according to an embodiment. In a system according to embodiments, diagram 300 displays an example partial file stream 308. The partial file stream 308 may have parts of a video file stream as discussed above. The partial file stream may have a beginning part 302, a middle part 304, and end part 306.

A system according to an embodiment may determine the partial file stream parts based on predetermined settings. The sizes of the beginning and end parts of the partial file stream may be determined based on a predefined fixed amount (e.g., 6 MB from the beginning and 0.5 MB from the end of the video file stream, or any other amounts) or based on a percentage of the entire video file stream (e.g., 3% from the beginning and 0.5% from the end or any other predefined percentage). The fixed size or percentage may be determined based on a video source, a resolution of the video file stream, or a bit rate of the video file stream. The beginning and end parts of the video file stream may contain metadata such as length, frame rate, etc. of the video file stream from which an external process may generate the thumbnail in the sandbox. Thus, any size may be predefined for the beginning and end parts based on percentage of the entire file stream or a fixed size amount.

According to another embodiment, the middle part of the partial file stream may contain zeros or an indication to the file system as if that part is filled with zeros (e.g., NTFS sparse file feature) to save resources such as bandwidth as discussed above. Bandwidth savings may enable a user to view the thumbnail for the video file stream without consuming large quantities of data to generate the thumbnail from a large video file stream. The partial file stream may also enable thumbnail processes to save processing resources by minimizing decoding time. In addition, processing resources may be saved by only decoding the beginning part of the file stream 302 and the end part of the file stream 306. Additionally, the partial file stream 308 may have the same properties as the video file stream such as length, metadata, etc.

The example systems in FIG. 1 through 3 have been described with specific devices, applications, and interactions. Embodiments are not limited to systems according to these example configurations. A system for providing a partial file stream for generating a thumbnail may be implemented in configurations employing fewer or additional components and performing other tasks. Furthermore, specific protocols and/or interfaces may be implemented in a similar manner using the principles described herein.

Figure 4:
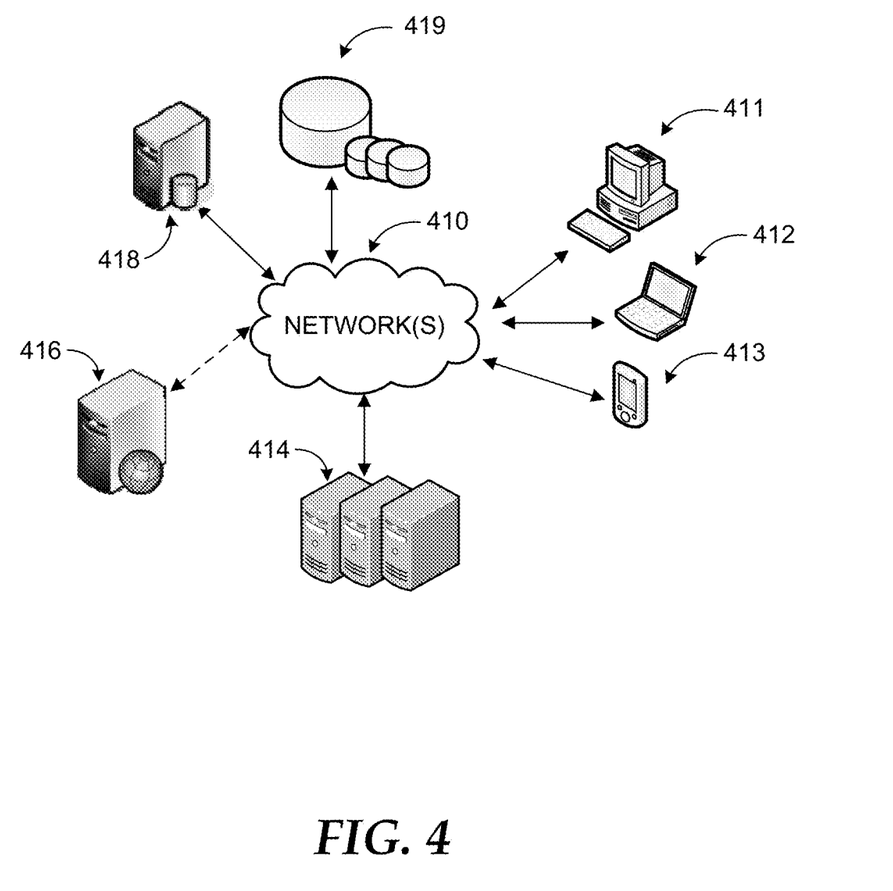
FIG. 4 is a networked environment, where a system according to embodiments may be implemented.

FIG. 4 is an example networked environment, where embodiments may be implemented. A system for providing a partial file stream for generating a thumbnail may be implemented via software executed over one or more servers 414 such as a hosted service. The platform may communicate with client applications on individual computing devices such as a smart phone 413, a laptop computer 412, or desktop computer 411 ('client devices') through network(s) 510.

Client applications executed on any of the client devices 411-413 may facilitate communications via application(s) executed by servers 414, or on individual server 416. An application executed on one of the servers may generate a partial file stream from beginning and end parts of a file stream adjoined by an empty middle part. The application may transfer the partial file stream from data store(s) 419 directly or through database server 418 to a sandbox for exposing the partial file stream through external processes (e.g. thumbnail generating processes) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for providing a partial file stream for generating a thumbnail. Furthermore, the networked environments discussed in FIG. 4 are for illustration purposes only. Embodiments are not limited to the example applications, modules, or processes.

Figure 5:
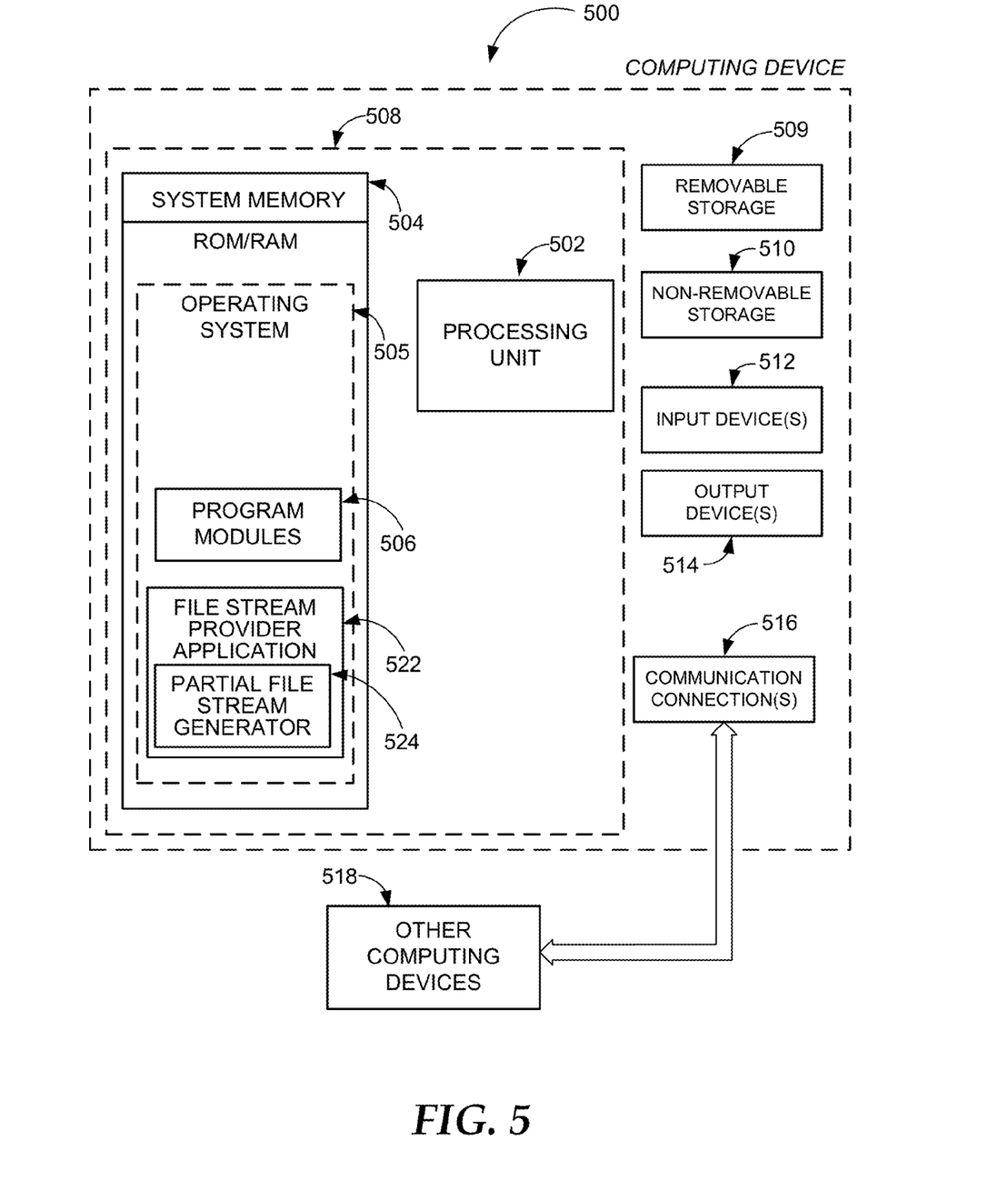
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a file stream provider application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, file stream provider application 522, and partial file stream generator module 524.

Partial file stream generator module 524 may enable a computing device 500 to generate a partial file stream with an empty middle part corresponding to a file stream such as a video file stream to be used in a sandbox by processes to generate thumbnail of the file stream. Through the partial file stream generator module 524, the file stream provider application 522 may minimize resource utilization. The file stream provider application 522 may also minimize exposure to malware from external processes while providing access to data such as video file streams for user based services such as thumbnail viewing for the video file streams. File stream provider application 522 and partial file stream generator module 524 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 610. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
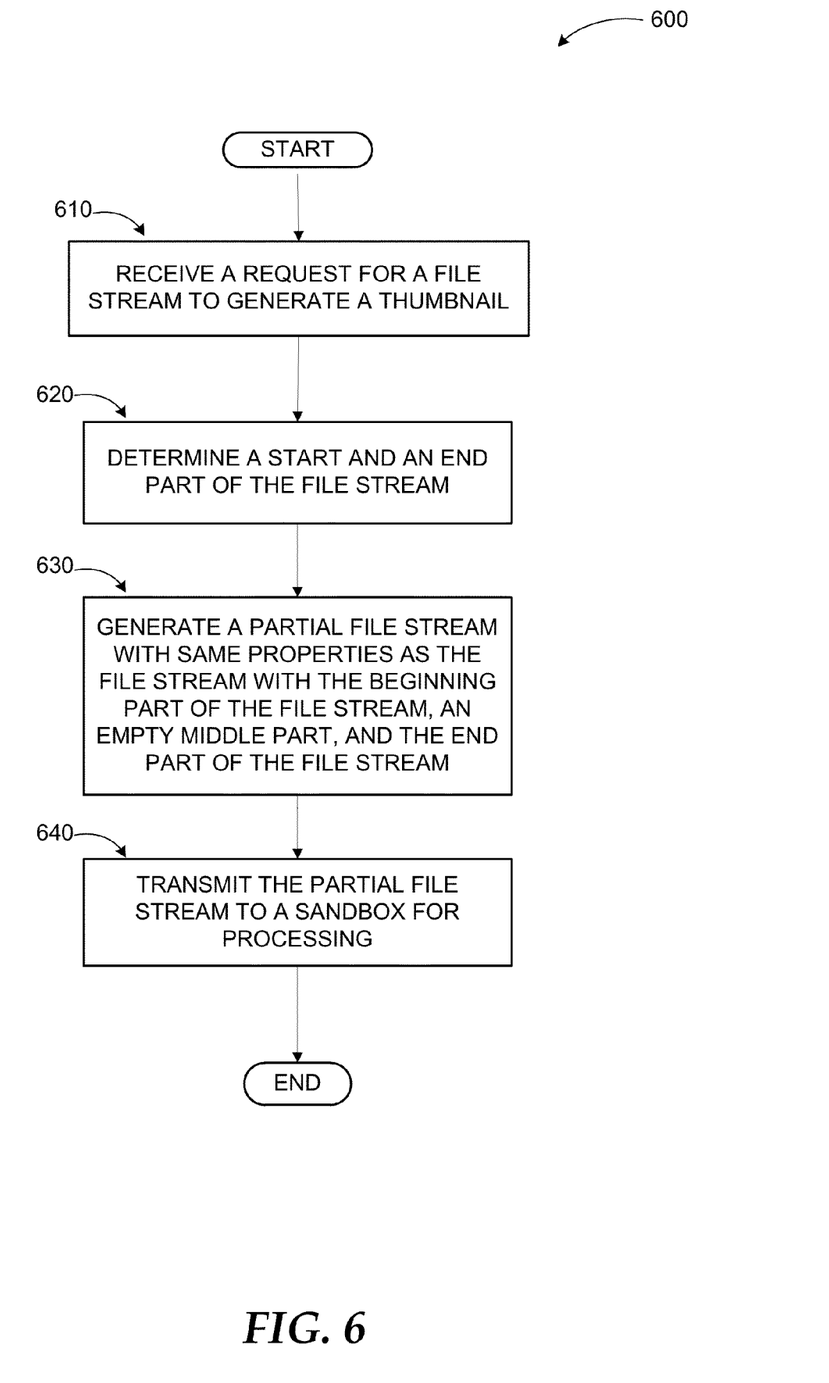
FIG. 6 illustrates a logic flow diagram for a process of providing a partial file stream for generating a thumbnail according to embodiments.

FIG. 6 illustrates a logic flow diagram for a process 600 of providing a partial file stream for generating a thumbnail according to embodiments. Process 600 may be implemented on a computing device that may host file streams such as video file streams.

Process 600 begins with operation 610, where a file stream provider system may receive a request for a file stream to generate a thumbnail. The system may host file streams such as video file streams and execute processes to manage and provide access to the file streams. At operation 620, the system may determine a start and an end part of the file stream. The determination may be based on predetermined settings such as a preset size as the beginning and end parts of the file stream. The determination may also be based upon a ratio of the file stream size.

At operation 630, the system may generate a partial file stream with same properties as the file stream with the beginning part of the file stream, an empty middle part, and the end of the file stream. The partial file stream may have the same length and metadata as the file stream. At operation 640, the system may transmit the partial file stream to a sandbox for processing. Small size of the partial file stream compared to the file stream may minimize resource utilization. Exposing the partial file stream to external processes in a sandbox may stop exposure to potential malware, compared to direct access to the system, while still enabling services such as file stream access for generating thumbnail.

The operations included in process 600 are for illustration purposes. Providing a partial file stream for generating a thumbnail may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide a partial file stream for generating a thumbnail, the method comprising:
    receiving a request for a file stream to generate the thumbnail;
    determining a beginning part of the file stream and an end part of the file stream;
    generating the partial file stream with attributes similar to the file stream, by preserving the beginning part of the file stream, inserting zeros in place of data in an empty middle part by employing a New Technology File System (NTFS) sparse file feature to preserve bandwidth resources, and preserving the end part of the file stream, wherein the beginning part and the end part of the file stream include metadata associated with the file stream; and
    transmitting the partial file stream to a sandbox for processing through a video codec, wherein the video codec is enabled to generate the thumbnail from the metadata to minimize decoding time of the file stream by decoding the beginning of the file stream in the sandbox and the end part of the file stream in the sandbox.

2. The method of claim 1, wherein the file stream is a video file stream.

3. The method of claim 2, further comprising:
    determining a beginning part of the file stream based on a first predefined data amount from the beginning part of the file stream; and
    determining an end part of the file stream based on a second predefined data amount from the end part of the file stream.

4. The method of claim 3, wherein the first predefined data amount and the second predefined data amount are determined based on at least one from a set of: a video source, a resolution of the video file stream, and a bit rate of the video file stream.

5. The method of claim 2, wherein an end part of the video file stream includes the metadata, wherein the metadata includes a length of the video file stream.

6. The method of claim 2, wherein the end part of the video file stream includes metadata, wherein the metadata includes a frame rate of the video file stream.

7. The method of claim 1, wherein the partial file stream is provided by a distributed application storing the file stream across multiple servers.

8. A computing device to provide a partial file stream to generate a thumbnail, the computing device comprising:
    a memory;
    a processor coupled to the memory, the processor executing a file stream provider application, wherein the file stream provider application is configured to:
        receive a request for a video file stream to generate the thumbnail;
        determine a beginning part of the video file stream and an end part of the video file stream;
        generate the partial file stream with attributes similar to the video file stream, by preserving the beginning part of the video file stream, inserting zeros in place of data in an empty middle part by employing a New Technology File System (NTFS) sparse file feature, and preserving the end part of the video file stream, wherein the beginning and end parts of the video file stream include metadata associated with the video file stream; and
        transmit the partial file stream to a sandbox to process through a video codec, wherein the video codec is enabled to generate the thumbnail from the metadata to minimize decoding time of the video file stream by decoding the beginning of the video file stream in the sandbox and the end part of the video file stream in the sandbox.

9. The computing device of claim 8, wherein the beginning and end parts of the partial file stream are determined based on a percentage of an entirety of the video file stream.

10. The computing device of claim 9, wherein the percentage is determined based on at least one from a set of: a video source, a resolution of the video file stream, and a bit rate of the video file stream.

11. The computing device of claim 8, wherein the file stream provider application is configured to increase security for the computing device by limiting exposure to external processes and malware through the use of the partial file stream from the sandbox.

12. The computing device of claim 8, wherein the computing device is a file stream server that is part of a hosted service.

13. The computing device of claim 12, wherein the file stream server is configured to store and transmit a thumbnail and metadata for a video file stream to requesting users.

14. A computer-readable memory device with instructions stored thereon to provide a partial file stream to generate a thumbnail, the instructions comprising:
receiving a request for a video file stream to generate the thumbnail;
determining a beginning part of the video file stream and an end part of the video file stream based on one of: a fixed data amount from a beginning and an end of the video file stream, respectively, and a percentage size of an entirety of the video file stream;
generating the partial file stream with attributes similar to the video file stream, by preserving the beginning part of the video file stream, inserting zeros in place of data in an empty middle part by employing a New Technology File System (NTFS) sparse file feature, and preserving the end part of the video file stream, wherein the beginning and end parts of the video file stream include metadata associated with the video file stream;
generating the thumbnail based on the metadata of the partial file stream; and
transmitting at least one of the thumbnail and the partial file stream to a sandbox to process through a video codec, wherein the video codec is enabled to generate the thumbnail from the metadata to minimize decoding time of the video file stream by decoding the beginning of the video file stream in the sandbox and the end part of the video file stream in the sandbox.

15. The computer-readable memory device of claim 14, wherein the sandbox is one of:
a local process executed as a separate process at a computing device storing the instructions; and
a remote process executed in another computing system and accessed through a network.

16. The computer-readable memory device of claim 14, wherein instructions further comprise:
transmitting the thumbnail and the metadata to a requesting user from the sandbox; and
transmitting a record of results from processing the partial file stream in the sandbox to an administrator.

* * * * *